(12) United States Patent
Okai et al.

(10) Patent No.: US 7,555,893 B2
(45) Date of Patent: Jul. 7, 2009

(54) AIRCRAFT PROPULSION SYSTEM

(75) Inventors: Keiichi Okai, Tokyo (JP); Takeshi Tagashira, Tokyo (JP); Ryoji Yanagi, Tokyo (JP); Hiroshi Nomura, Tokyo (JP)

(73) Assignees: Japan Aerospace Exploration Agency, Tokyo (JP); Nihon University, Tokyo (JP)

( * ) Notice: Subject to any disclaimer, the term of this patent is extended or adjusted under 35 U.S.C. 154(b) by 438 days.

(21) Appl. No.: 11/336,828

(22) Filed: Jan. 23, 2006

(65) Prior Publication Data
US 2006/0254255 A1  Nov. 16, 2006

(30) Foreign Application Priority Data
Jan. 25, 2005 (JP) ............................ 2005-016538

(51) Int. Cl.
*F02K 1/00* (2006.01)
(52) U.S. Cl. .................. 60/228; 60/224; 60/226.1; 310/184; 310/185; 310/187; 310/198; 310/203; 310/206; 244/1 R; 244/53 R; 244/60
(58) Field of Classification Search .......... 244/51, 244/52, 53 R, 54, 62, 73 R; 60/224, 226.1, 60/228; 310/184, 185, 187, 195, 198, 203, 310/206
See application file for complete search history.

(56) References Cited

U.S. PATENT DOCUMENTS

| | | | | |
|---|---|---|---|---|
| 2,939,648 A * | 6/1960 | Fleissner | ................ | 244/12.2 |
| 3,408,517 A * | 10/1968 | Willyoung | ................ | 310/198 |
| 3,437,290 A * | 4/1969 | Norman | ................ | 244/12.2 |
| 4,698,563 A * | 10/1987 | Ban | ................ | 318/400.41 |
| 5,333,444 A * | 8/1994 | Meng | ................ | 60/221 |
| 5,469,816 A * | 11/1995 | Murakawa et al. | ................ | 123/2 |
| 5,842,667 A * | 12/1998 | Jones | ................ | 244/114 R |
| 6,111,390 A * | 8/2000 | Inaba et al. | ................ | 322/28 |
| 6,296,957 B1 * | 10/2001 | Graage | ................ | 429/12 |
| 7,032,861 B2 * | 4/2006 | Sanders et al. | ................ | 244/23 A |
| 2003/0080242 A1 * | 5/2003 | Kawai | ................ | 244/12.4 |
| 2004/0069901 A1 * | 4/2004 | Nunnally | ................ | 244/34 R |
| 2005/0001582 A1 * | 1/2005 | Goto et al. | ................ | 318/802 |

(Continued)

FOREIGN PATENT DOCUMENTS

JP        11-200888        7/1999

*Primary Examiner*—Michael R Mansen
*Assistant Examiner*—Philip J Bonzell
(74) *Attorney, Agent, or Firm*—Westerman, Hattori, Daniels & Adrian, LLP.

(57) ABSTRACT

To provide an aircraft propulsion system which can secure the optimum thrust and thrust vector for flight conditions, as well as the optimum sectional area for the engine, and which is highly compatible with the environment.

An electrical generator is coupled to a turbofan engine, the electrical generator is driven by output power of the turbofan engine to output electric power, and an electromagnetic driving fan is driven by the electric power. On the other hand, after bringing each of coils in the electromagnetic driving fan to a superconductive state, liquid hydrogen is introduced to a heat exchanger, collects the energy of exhaust as heat, is then vaporized, and thereafter supplied to a combustor and to a fuel cell. Further, the electromagnetic driving fan is changed in its rotational phase by a rotating mechanism portion, is made movable in a width direction of a wing and a wing chord direction by a slide mechanism portion, and can be stored inside or outside the wing by a storage mechanism portion.

9 Claims, 6 Drawing Sheets

U.S. PATENT DOCUMENTS

2005/0162030 A1* 7/2005 Shah et al. .................. 310/165
2005/0181246 A1* 8/2005 Nakaji ......................... 429/13
2005/0206268 A1* 9/2005 Walter et al. ................. 310/225

* cited by examiner (a)

(b)

(c)

(a)

(b)

AIRCRAFT PROPULSION SYSTEM

BACKGROUND OF THE INVENTION

1. Field of the Invention

The present invention relates to an aircraft propulsion system, and particularly to an aircraft propulsion system which can secure the optimum thrust and thrust vector for flight conditions, as well as the optimum sectional area for the engine, and which is highly compatible with the environment.

2. Description of the Related Art

The optimum thrust, thrust vector, and sectional area for the engine are required in various flight conditions of an aircraft engine, such as take-off, cruise and landing conditions. For example, maximum thrust is required in a take-off condition, or thrust for increasing a direction of braking is required in a landing condition, whereas in a cruise condition are not required low air resistance. High bypass-ratio turbofan engines, which are used for many highly efficient civil aircraft engines, have large air inlet sectional area (engine sectional area), and do not require thrust during high-speed cruise as much as during take-off, thus the excessively large sectional area of the engine increases the resistance of the aircraft, resulting in a negative impact on the flight performances. For the purpose of simply increasing the thrust, an afterburner may be mounted in a rear portion of the engine to reduce the outer diameter of the fan, but actuation of the afterburner causes tremendous noise, and thus is not desirable in terms of the engine operation efficiency. As described above, with normal fixed engines, it is difficult to realize the optimum engine disposition and engine sectional area for all the flight conditions. However, it is of great benefit in aircraft traffic to deflect the thrust vector of aircraft engines, and the various ideas of the deflection have been proposed, thereby some of them are already in use. For example, Japanese Patent Application Laid-Open No. 2003-137192 (Title of the invention: "Vertical take-off and landing aircraft", Date of laid-open publication: May 14, 2003) discloses a turbofan engine where thrust vector is made variable.

Among the systems, mechanisms of moving engines, or thrust vectoring nozzles for deflecting nozzles are beneficial for military-aircraft use where prompt change in thrust vector in aircraft traffic, but are not so beneficial for the use of civil aircraft the majority of which have large bodies. Civil aircraft require thrust vectoring particularly during take-off and landing. Examples of existing techniques for take-off conditions include a high-lift device which utilizes Coanda effect for the exhaust from the engine which is mounted below the wing by lowering the flap of a rear end of a wing in order to achieve increase of the lift force, and a method of achieving creation of lift force from deflection of the engine itself seen in a VTOL airplane, and of obtaining upward lift force by directing the fan upward during take-off, upon reception of air supplied by an air supply. However, these are not so economical in terms of their limited effects, and their mechanisms tend to be complex. On the other hand, using a thrust reverse to generate reverse thrust and reduce the braking distance when landing has been already carried out as a general matter. The fact is that the mechanism of generating reverse thrust has somewhat complex mechanisms.

Further, the recent environmental compatibility, that is less noise and lower amount of emission gas, is one of the most important issues regarding the performances of aircraft engines. The main reason why many aircraft engines employ high bypass-ratio turbofan engines is to achieve high efficiency and noise reduction. However, there is a limit to the development of aircraft engines which are improved year by year in terms of environmental compatibility, thus new ideas for engine systems are necessary in order to improve the basic performances. For example, for the direction required in the development of new engine systems, increasing bypass ratio by further expanding the diameter of the fan is necessary in terms of noise reduction, and electrical output through the engine is required in terms of lower amount of emission gas. Incidentally, Japanese Patent Application Laid-Open No. H11-200888 (Title of the invention: "Fuel cell turbine engine", Date of laid-open publication: Jul. 27, 1999) discloses a fuel cell turbine engine which drives the motor by means of a fuel cell, drives the turbine by means of the motor, and drives the fan by means of output power of the turbine.

The problem in Japanese Patent Application Laid-Open No. 2003-137192 is that the turbofan engine with thrust vectoring mechanism is complex in terms of its mechanism, and the weight thereof is heavy.

Furthermore, the combination of a conventional electric motor and turbofan engine, or the fuel cell turbine engine disclosed in Japanese Patent Application Laid-Open No. H11-137192 has limited output, although it is compatible with the environment, thus the applicability to larger aircrafts is limited.

SUMMARY OF THE INVENTION

The present invention is contrived in view of the above problems of the conventional technologies, and an object of the present invention is to provide an aircraft propulsion system which can secure the optimum thrust and thrust vector for flight conditions, as well as the optimum sectional area for the engine, and which is highly compatible with the environment.

In order to achieve the above-described object, the first invention an aircraft propulsion system comprises a first propulsion unit which generates thrust and a second propulsion unit which has thrust vectoring means for varying a vector of the thrust, wherein the second propulsion unit is an electromagnetic driving fan in which an armature coil is disposed on an outer circumference of the fan, and an excitation coil is disposed on an inner peripheral surface of a casing portion of the fan so as to face the armature coil, and which is driven by electromagnetic force generated by a mutual induction effect between the armature coil and the excitation coil.

In the aircraft propulsion system of the first invention, the second propulsion unit is an electromagnetic driving fan which is drive by electromagnetic force generated by a mutual induction effect between the armature coil and the excitation coil, and doest not require chemical fuel as the energy source, thus the total amount of exhaust containing harmful substances is preferably reduced. Further, since the armature coil is disposed on an outer circumference of the fan, heavy parts such as an iron core and the like are not necessary, whereby the weight can be reduced. Also, large torque can be obtained with electromagnetic force that is produced by a mutual induction effect, thus the outer diameter of the fan can be enlarged. Accordingly, the thrust can be increased and the bypass ratio can also be increased, whereby noise reduction is achieved. Moreover, the electromagnetic driving fan does not require a core engine, and has a simple configuration. In addition, a flexible line can be employed as the power supply line and thus, the mechanism for varying a thrust vector is not affected negatively. Accordingly, environmental compatibility is improved while securing the optimum thrust and thrust vector for flight conditions of the aircraft.

In the second invention, the aircraft propulsion system comprises storage means for storing the second propulsion unit in a wing or folding the unit at an external surface of the wing, and wing moving means for moving the second propulsion unit with respect to a width direction of the wing and a wing chord direction.

In the aircraft propulsion system of the second invention, the second propulsion unit can be stored in a wing during high-speed cruise, thus the frontal projected area of the airframe is reduced, whereby the air resistance to the airframe can be reduced. Moreover, the second propulsion unit can be moved with respect to a width direction of the wing or a wing chord direction and thus, for example by disposing the second propulsion unit coaxially with respect to the first propulsion unit, the bypass ratio of the first propulsion unit can be increased significantly, and further the noise level at discharging the exhaust gas from the first propulsion unit can be reduced significantly. Therefore, environmental compatibility can be improved while securing the optimum sectional area for the engine in accordance with the flight conditions of the aircraft.

In the third invention, the first propulsion unit or the second propulsion unit comprises electrical output generating means.

In the aircraft propulsion system of the third invention, electric power, which is generated by the electrical output generating means, can be supplied preferably to the electromagnetic driving fan which is the second propulsion unit. Accordingly, an operational ratio of the electromagnetic driving fan can be increased, as a result of which the ratio of the chemical fuel in the power source can be reduced and the ratio of the electrical energy can be increased, hence the total amount of exhaust containing harmful substances is reduced.

In the fourth invention, the electrical output generating means is an aircraft generator, a fuel cell, or a combination thereof with an electrical accumulator.

In the aircraft propulsion system of the fourth invention, in addition to a normal aircraft generator, a fuel cell or combination of the aircraft generator and fuel cell with an actuator can recharge the battery while producing electric power efficiently. As a result, the ratio of the chemical fuel as the power source can be reduced and the ratio of the electrical energy can be increased, hence the total amount of exhaust containing harmful substances is reduced.

In the fifth invention, the first propulsion unit and the fuel cell use liquid hydrogen as fuel.

In the aircraft propulsion system of the fifth invention, liquid hydrogen is the fuel, thus the combustion temperature is reduced by steam which is produced as a result of combustion of the liquid hydrogen with air. As a result, generation of nitrogen oxides can be controlled preferably, and, since the fuel does not contain carbon, carbon compounds such as carbon dioxide can be prevented from being exhausted, whereby environmental compatibility is improved significantly.

In the sixth invention, the aircraft propulsion system comprises means in which the liquid hydrogen brings the armature coil and the excitation coil to a superconductive state and is vaporized by receiving heat from the first propulsion unit or the second propulsion unit.

In the aircraft propulsion system of the sixth invention, the armature coil and the excitation coil are brought to a superconductive state by the liquid hydrogen. Accordingly, the internal resistance to the coils become small as much as possible, almost no electric power is consumed when the electromagnetic driving fan as the second propulsion unit is driven, whereby the energy efficiency is improved significantly. Moreover, heat that is equivalent to heat of vaporization of the liquid hydrogen is drawn from exhaust, whereby the temperature of the exhaust is reduced, as a result of which generation of nitrogen oxides is controlled preferably.

In the seventh invention, the fuel cell is disposed between a compressor and a combustor that configure the first propulsion unit.

In the aircraft propulsion system of the seventh invention, compressed air can be supplied to an oxidant electrode of the fuel cell, and vaporized hydrogen gas can be supplied to the both fuel cell and the combustor. Accordingly, the electrical efficiency of the fuel cell and combustion efficiency of the combustor are simultaneously enhanced.

In the eighth invention, the second propulsion unit comprises means or increasing input pressure of the fuel cell.

In the aircraft propulsion system of the eighth invention, the electrical efficiency of the fuel cell is improved significantly.

According to the aircraft propulsion system of the present invention, following effects can be obtained in terms of improvement of the flight performance.

(1) The second propulsion unit is the electromagnetic driving fan in which the armature coil is disposed on the outer circumference of the fan and the excitation coil is disposed in on the inner peripheral surface of the casing, thus heavy parts such as a core engine and an iron core are not necessary, whereby the configuration thereof can be made simple and the weight thereof can be reduced significantly to be lightweight.

(2) As a result, the thrust vectoring means for changing a thrust vector, the storage means for storing the second propulsion unit in a wing or folding the unit at a surface of the wing, and the wing driving means for moving the second propulsion unit with respect to a width direction of the wing and a wing chord direction can be realized easily. Accordingly, the optimum thrust and thrust vector for flight conditions can be secured, and the optimum sectional area for the engine in accordance with the flight conditions can also be secured.

Moreover, according to the aircraft propulsion system of the present invention, the following effects can be obtained in terms of environmental compatibility.

(1) The second propulsion unit is the electromagnetic driving fan which uses the electrical energy as the energy source, thus it doest not discharge exhaust containing harmful substances.

(2) Since the first propulsion unit comprises the electrical output generating means, the electrical energy is preferably generated and accumulated to enhance an operational ratio of the electromagnetic driving fan, as a result of which the amount of exhaust containing harmful substances is reduced.

(3) Liquid hydrogen is used as fuel, and the liquid hydrogen brings the armature coil and the excitation coil of the electromagnetic driving fan to a superconductive state, thus there is almost no loss of electrical resistance. As a result, the energy efficiency of the electromagnetic driving fan is improved. Further, the liquid hydrogen exchanges heat with exhaust, the energy of the exhaust is collected, resulting in improvement of the energy efficiency of the entire system.

(4) Furthermore, the electrical efficiency of the fuel cell is improved due to the fact that vaporized hydrogen gas is provided to the fuel cell and the combustor, and that the fuel cell is disposed between the compressor and the combustor.

(5) In addition, in the combustor, the temperature of the exhaust is reduced by water vapor which is generated as a result of a combustion reaction, whereby generation of nitrogen oxides is controlled preferably. At the same time, the liquid fuel does not contain carbon compound, and thus does not exhaust carbon dioxide.

(6) In the electromagnetic driving fan, the armature coil producing electromagnetic force is disposed on the outer circumference of the fan, and then large torque can be produced with small the size of the force, as a result of which the outer diameter of the fan can be enlarged. Accordingly, the bypass ratio can be increased, and the noise level at discharging the exhaust gas is reduced.

DESCRIPTION OF THE PREFERRED EMBODIMENTS

The present invention is described hereinafter in detail on the basis of the embodiments shown in the figures.

Embodiment 1

Figure 1:
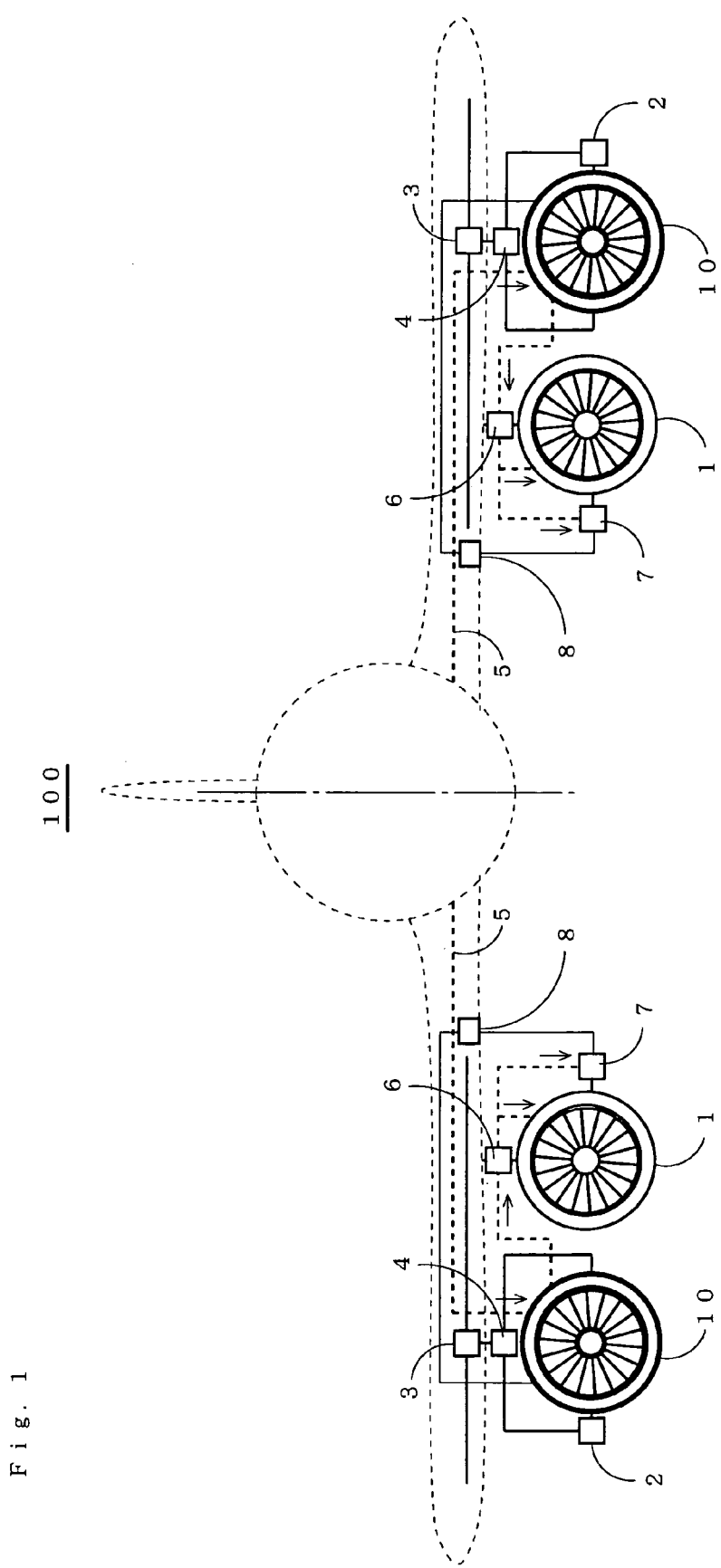
FIG. 1 is an explanatory diagram of a configuration, showing the aircraft propulsion system of an embodiment of the present invention.

FIG. 1 is an explanatory diagram of a configuration, showing an aircraft propulsion system 100 of an embodiment of the present invention.

The aircraft propulsion system 100 comprises a turbo fan engine 1, 1 as a first propulsion unit for generating thrust, an electromagnetic driving fan 10, 10 as a second propulsion unit, a rotating mechanism portion 2, 2 as thrust vectoring means for vectoring a thrust vector of the electromagnetic driving fan, a slide mechanism portion 3, 3 as wing moving means for moving the electromagnetic driving fan with respect to a width direction of the wing and a wing chord direction, a storage mechanism portion 4, 4 as storage means for storing the electromagnetic driving fan in a wing or an external surface of the wing, a liquid fuel line 5, 5 which supplies liquid hydrogen which is provided as fuel in the turbofan engine while cooling each coil of the electromagnetic driving fan, a heat exchanger 6, 6 in which exhaust from the turbofan engine and the liquid fuel exchange heat with each other, a generating portion 7, 7 as electrical output generating means of the turbofan engine, and an accumulating portion 8, 8 which accumulates electric power produced from a fuel cell. It should be noted that the heat exchanger 6 and the electrical generator 7 are illustrated so as to be parallel with the turbofan engine 1, but they may be disposed coaxially. Further, the electromagnetic driving fan 10 is described in detail with reference to FIG. 2 and FIG. 3.

The rotating mechanism portion 2 is configured by combining, for example, an axis of rotation with a rotating machine. Incidentally, the rotating machine may be of electric motor-driven type or hydraulic type.

The slide mechanism portion 3 is configured by combining, for example, a plurality of reciprocating machines. Incidentally, the reciprocating machines may be of electric motor-driven type or hydraulic type.

The storage mechanism portion 4 is configured by combining, for example, a hinge with the rotating machine. Incidentally, the rotating machine may be of electric motor-driven type or hydraulic type.

In the liquid fuel line 5, liquid hydrogen as the fuel flows therein and cools an armature coil and excitation coil of the electromagnetic driving fan 10 to bring them into a superconductive state. Thereafter, the liquid hydrogen is vaporized after receiving the heat energy from exhaust discharged from the turbofan 1 in the heat exchanger 6. Some of the vaporized hydrogen is provided inside a combustor of the turbofan 1, and the rest is provided to a fuel side electrode of the fuel cell. Although not shown, the liquid hydrogen is, for examples, stored in a cryogenic apparatus.

In the heat exchanger 6, for example, a narrow tube is embedded in an exhaust nozzle of the turbofan 1.

Moreover, in the aircraft propulsion system 100, the electromagnetic driving fan 10 is disposed in each of the wings, but a configuration is possible in which another electromagnetic driving fans 10 is disposed ahead of the axis of the turbofan engine 1 resulting in two electromagnetic driving fans 10, 10 disposed on each of the wings.

According to the aircraft propulsion system 100, the electromagnetic driving fan is light in terms of weight, and has a simple configuration. Therefore, a thrust vectoring mechanism, storage mechanism, and wing moving mechanism can be realized easily, and the optimum thrust and thrust vector can be secured in accordance with the flight conditions, as well as the optimum sectional area of the engine.

Figure 2:
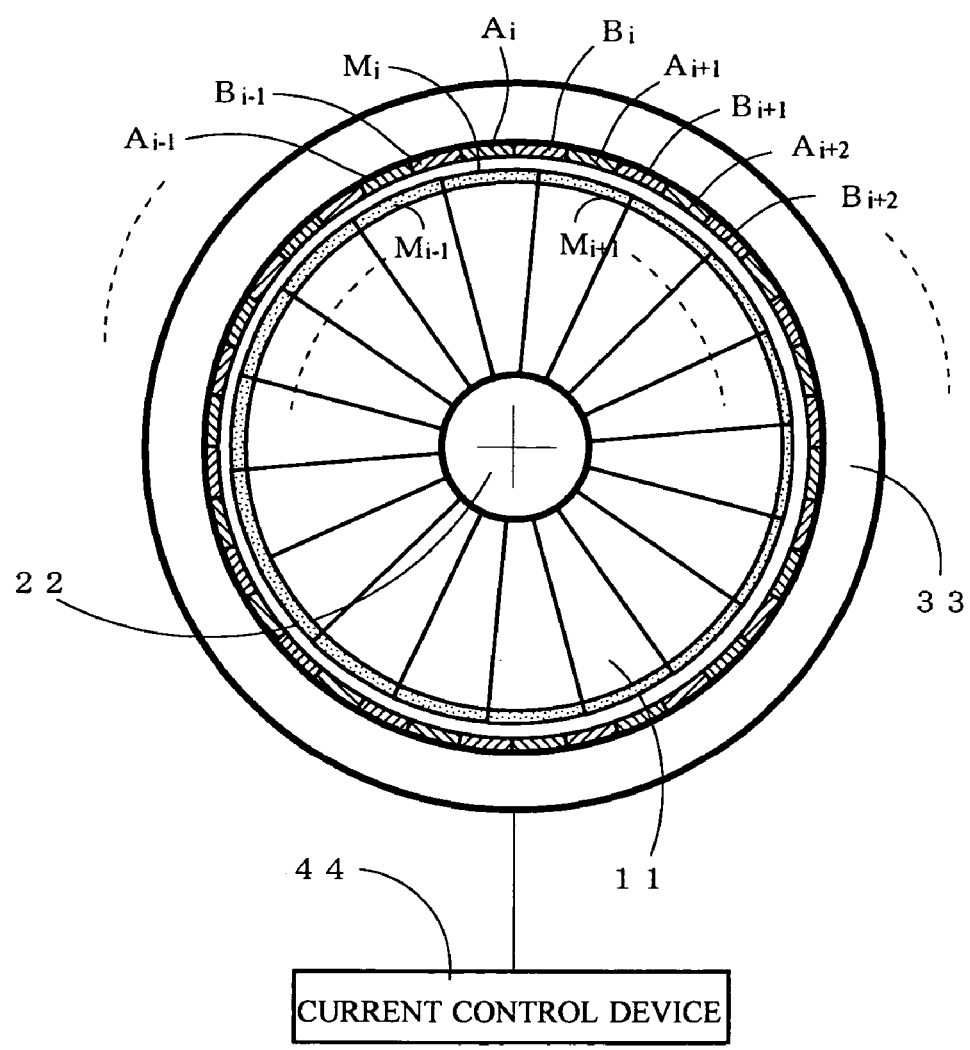
FIG. 2 is a front view showing a main part of the electromagnetic driving fan of the embodiment.

FIG. 2 is a front view showing a main part of the electromagnetic driving fan 10 of the embodiment.

The electromagnetic driving fan 10 comprises a fan blade 11 which increases the flow speed of air which has been taken in and injects the air backward so that thrust in a opposite direction of the injection is produced in response to the injection, a shaft 22 to which the fan blade 11 is attached, a fan casing 33 which stores the fan blade 11 and the shaft 22, a coil $A_i$ row (i=1, 2, . . . , n) as a split excitation coil which is attached to an inner peripheral surface of the fan casing 33 so as to face an outer circumference of the fan blade 11, and generates an effective magnetic field related to effective electromagnetic force for rotating the fan blade 11, a coil $B_i$ row (i=1, 2, . . . , n) as a split excitation coil which applies effective induced current related to the effective electromagnetic force to a split armature coil which is described hereinbelow, a coil $M_i$ row (i=1, 2, . . . , n) as a split armature coil which is attached to the outer circumference of the fan blade 11 and generates the effective electromagnetic force through the interaction between the effective magnetic field and the effective induced current, a current control device 44 which controls current for the coil $A_i$ and the coil $B_i$, and a position detection sensor (not shown) which detects an angle or displacement of the coil $M_i$. It should be noted that the split excitation coils change the roles thereof in accordance with a relative position with respect to the coil $M_i$. Specifically, when the split excitation coil overlaps with a central portion of the coil $M_i$, the split excitation coil supplies an effective magnetic field related to the abovementioned effective electromagnetic force to the coil $M_i$, and, when the split excitation coil overlaps with either one of end portions of the coil $M_i$, the split excitation coil applies effective induced current related to the effective electromagnetic force to the coil $M_i$. Therefore, for convenience of explanation, distinction is made such that the coil $A_i$ is for the case in which an effective magnetic field related to the effective electromagnetic force is formed in the coil $M_i$, and the coil $B_i$ is for the case in which effective induced current related to the effective electromagnetic force is applied to the coil $M_i$; however, the coil $A_i$ and the coil $B_i$ are exactly the same coils in terms of the structure, thus the split excitation coils may be the coil $A_i$ and the coil $B_i$.

Furthermore, although not shown in the figures, the dual liquid fuel lines 5, 5 that one is inlet line and the other outlet line are connected to the fan blade 11 and the fan casing 33 respectively, wherein liquid hydrogen supplied from the inlet liquid fuel supply line 5 circulates and cools the coil $A_i$ row, coil $B_i$ row, and coil $M_i$ to bring them to a superconductive state. Thereafter, the liquid hydrogen is provided to the heat exchanger 6 of the turbofan engine 1 while flowing in the outlet liquid fuel supply line 5, and exchanges heat with the exhaust. The liquid fuel is then vaporized and provided to the fuel side electrode of the fuel cell and the combustor of the turbofan engine 1.

Figure 3:
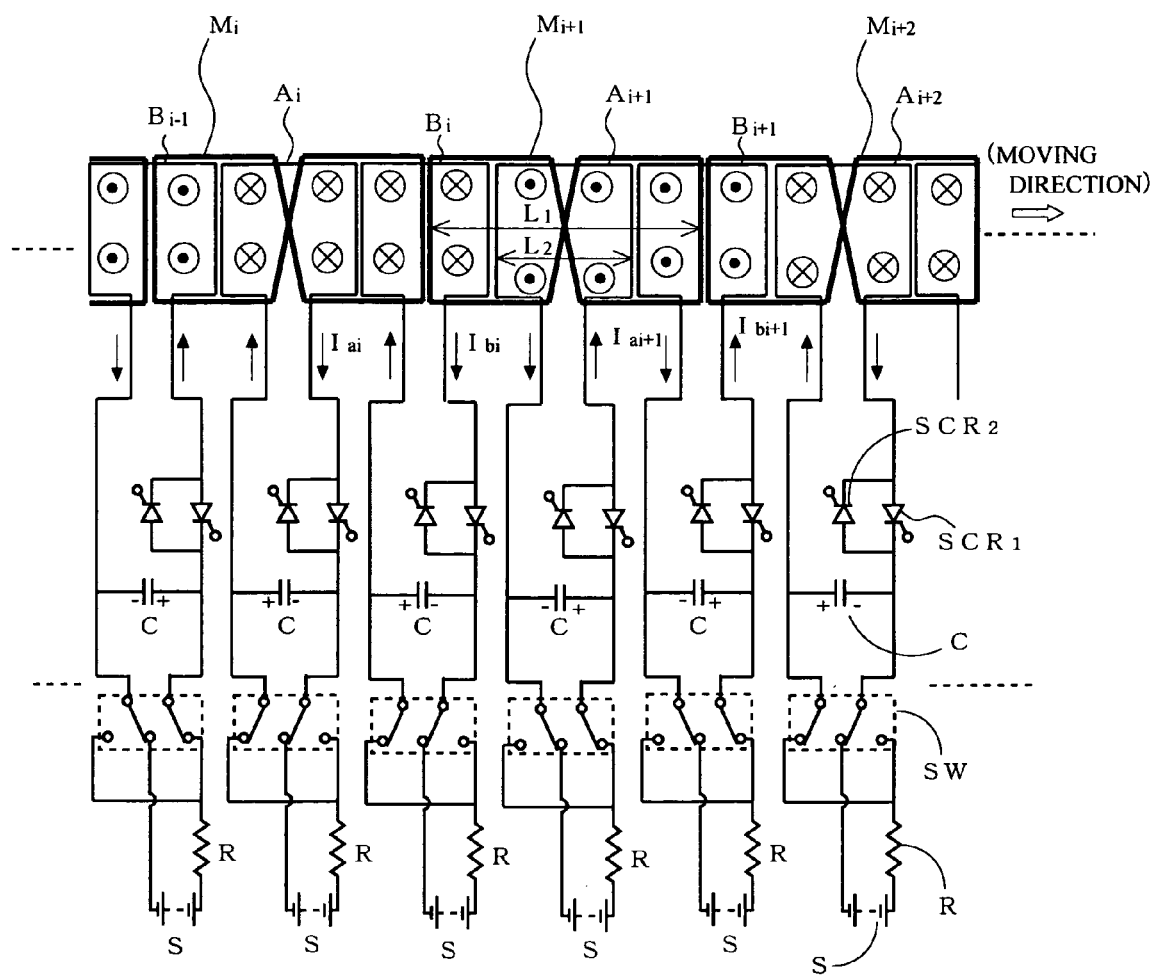
FIG. 3 is an explanatory diagram showing a two-dimensional relative position of a coil $A_i$ row or coil $B_i$ row with respect to a coil $M_i$ row.

In the present embodiment, as shown in FIG. 3, the width length of the coil $M_i$ is set as $L_1$, and the width length of the coil $A_i$ or the coil $B_i$ is set as $L_2$, which is abbreviated as $L_1/2$.

It should be noted that the abovementioned effective magnetic field is one of magnetic fields formed in the split armature coils by the split excitation coils, and is a cause of generation of the effective electromagnetic force. The abovementioned effective induced current is one of induced currents applied to the split armature coils by the split excitation coils, and is a cause of generation of the effective electromagnetic force.

Further, the current control device 44 relates to control of current for the coil $A_i$ row and the coil $B_i$ row, and performs control of current on, for example, a combination of a plurality of continuous coils A and coils B, or, for example, a group of a coil $A_i$, coil $B_i$, coil $A_{i+1}$, and coil $B_{i+1}$.

According to the electromagnetic driving fan 10, a configuration is employed in which the coil $M_i$ row (i=1, 2, ..., n) as the armature coil is disposed on the outer circumference of the fan blade 11, and an iron core and the like are not required, thus the entire weight of the electromagnetic driving fan can be made lightweight. Furthermore, since the coil $M_i$ row (i=1, 2, ..., n) is disposed on the outer circumference of the fan blade 11, which is far from the center of rotation, large torque can be produced with relatively small effective electromagnetic force, and the fan blade 11 can be rotated preferably.

FIG. 3 is an explanatory diagram showing a two-dimensional relative position of a coil $A_i$ row or coil $B_i$ row with respect to a coil $M_i$ row.

This figure shows a state in which the coil $M_i$ row is projected onto the inner peripheral surface of the fan casing 33, and the inner peripheral surface of the fan casing 33 is unrolled to be shows as a two-dimensional flat surface. It should be noted that the coil $A_i$ row or the coil $B_i$ row is disposed on the inner peripheral surface of the fan casing 33, thus they rest with respect to the coil $M_i$ row. On the other hand, the coil $M_i$ row is disposed on the outer circumference of the fan blade 11, thus it moves with respect to the coil $A_i$ row or the coil $B_i$ row.

The coil $A_i$ or coil $B_i$ is a, for example, single-wound or compound-wound split excitation coil in the form of a rectangle, and comprises a condenser C which constitutes an LC circuit at an end portion of each coils in conjunction with the coil $A_i$ or coil $B_i$, a first and a second silicon controlled rectifier $SCR_1$ and $SCR_2$ which conduct current to the coil $A_i$ or coil $B_i$ in two directions, a switching circuit SW which switches the bias direction of the condenser C in accordance with the polarity of the condenser C, and a power source S which supplies an electrical charge to the condenser C. It should be noted that switching control of the first and second silicon controlled rectifier $SCR_1$ and $SCR_2$ and the switching control of the switching circuit SW are performed by the current control device 44 on the basis of information from the position detection sensor which shows a position of rotation of the coil $M_i$.

Further, regarding the actuation of the electromagnetic driving fan 10, the coil $A_i$ and the coil $B_i$ have in common in terms of contribution to generation of effective electromagnetic force for rotating the fan blade 11 with respect to the coil $M_i$. However, the roles of the coil $A_i$ and the coil $B_i$ are completely different in terms of the mechanism that the coil $M_i$ generates the effective electromagnetic force. Specifically, the coil $A_i$ plays a role of providing the coil $M_i$ with an effective magnetic field related to effective electromagnetic force, and, on the other hand, the coil $B_i$ plays a role of applying the coil $M_i$ with effective induced current related to the effective electromagnetic force. Reactive induced current which is applied to the coil $M_i$ by the coil $A_i$ and does not contribute to rotation of the fan blade 11 is canceled out preferably due to the characteristics of the structure of the coil $M_i$, and reactive electromagnetic force, which is produced by reactive magnetic field which is provided to the coil $M_i$ by the coil $B_i$ and does not contribute to the rotation of the fan blade 11, is also canceled out.

Moreover, since the coil $A_i$ or the coil $B_i$ configure the LC circuit along with the condenser C, current that flows into the coil $A_i$ or the coil $B_i$ when the silicon controlled rectifiers are switched on is current which changes in time, or so-called alternating current. Accordingly, when the alternating current flows in the coil $A_i$ or coil $B_i$ as excitation current, a magnetic field which is formed by the excitation current and penetrates through the coil $M_i$ also changes in time. Therefore, the time change of the magnetic field causes induced current to flow in the coil $M_i$ in a direction of preventing the magnetic field from being changed in time. Accordingly, current can be allowed to flow in the coil $M_i$, which is an armature coil, without supplying current from outside.

Furthermore, when current flowing in the coil $A_{i+1}$ is taken as $I_{ai+1}$, and current flowing in the coil $B_{i+1}$ is taken as $I_{bi+1}$, the sizes of adjacent coils A or coils B become equal, and the directions of the adjacent coils become opposite with each other. Specifically, $|I_{ai}|=|I_{ai+1}|$ and $I_{ai}=-I_{ai+1}$, or $|I_{bi}|=|I_{bi+1}|$ and $I_{bi}=-I_{bi+1}$ are obtained.

Generally, when the width length of the coil $A_i$ or coil $B_i$ is taken as $L_2$, and the width length of the coil $M_i$ is taken as $L_1$, the relationship of $L_1/2 \leq L_2 < L_1$ is established between $L_1$ and $L_2$. Therefore, a magnetic field which is generated by applying current to the coil $A_i$ or coil $B_i$ can act on the coil $M_i$ efficiently. It should be noted that the present embodiment explains the case in which $L_2=L_1/2$ is obtained.

The coil $M_i$ is a figure-of-eight coil which crosses and forms symmetry at a central portion, and, for convenience of explanation, may be a single-wound or compound-wound coil. Because the coil $M_i$ crosses, for example, the induced currents applied to the coil $M_i$ by the coil $A_i$ are canceled out with each other at the central portion, as a result of which the coil $A_i$ provides the coil $M_i$ with only an effective magnetic field related to the effective electromagnetic force which contributes to rotation of the fan blade 11. On the other hand, the induced currents applied to the coil $M_i$ by, for example, the coil $B_i$ and coil $B_{i+1}$ respectively flow in the same direction at the central portion, and electromagnetic force generated by the induced currents is added. However, the directions of magnetic fields formed in the coil $M_{i+1}$ by the coil $B_i$ and coil $B_{i+1}$ at both end portions of the coil $M_i$ are opposite to each other, and the induced currents flow in the same direction, thus electromagnetic force generated by the interaction between the magnetic fields and the induced currents cancel out with each other, as a result of which the coil $B_i$ and the coil $B_{i+1}$ apply the coil $M_i$ with only effective induced current related to the effective electromagnetic force. Then, the effective electromagnetic force is generated by the interaction between the effective induced currents and the effective magnetic fields, and the fan blade 11 is rotated by the effective electromagnetic force.

It should be noted that the silicon controlled rectifiers are employed as the switching means in the present embodiment, but semiconductor switching elements such as a power transistor, power MOSFET, IGBT, or the like may be used.

Moreover, the power source S is, for example, a secondary battery, and the electric power is supplied by a combination of an aircraft generator as the electrical generator 7 and a fuel cell, a combination of a fuel cell and an electrical accumulator, a single fuel cell, a single electrical accumulator, or a combination of the fuel cell and electrical accumulator.

In the electromagnetic driving fan 10, the electrical energy, which is supplied in order to excite the split excitation coils such as coil $B_i$, coil $B_{i+1}$, and the like, is preferably collected and accumulated as the electrical energy again by the condenser C, and the electrical energy is reused by the switching means such as the silicon controlled rectifier in order to excite the split excitation coils again. Therefore, the electromagnetic driving fan 10 has an energy collection function. Moreover, the split armature coils and the split excitation coils are brought to the superconductive state by liquid hydrogen, as will be described hereinafter, and thus have extremely small resistance. Therefore, the electrical energy for exciting the split excitation coils is scarcely consumed in the process of generating the effective electromagnetic force for rotating the fan blade 11, and the energy efficiency of the electromagnetic driving fan itself is significantly increased.

Figure 4:
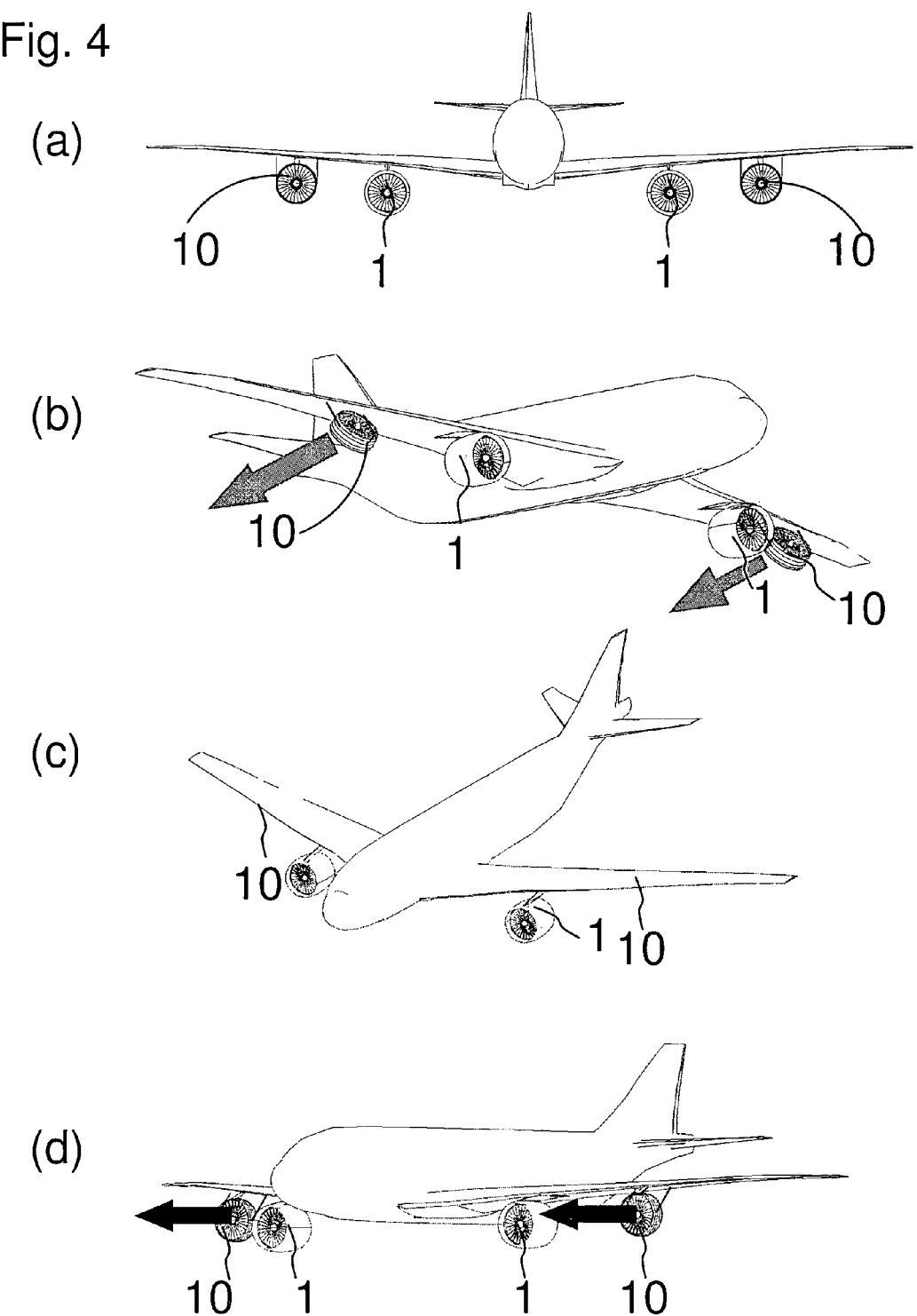
FIG. 4 is an explanatory diagram showing an applicable example for an aircraft of the aircraft propulsion system of the present invention.

FIG. 4 is an explanatory diagram showing an applicable example for an aircraft of the aircraft propulsion system 100 of the present invention.

In the aircraft propulsion system 100 shown in the applicable example, the turbofan engine 1 as the first propulsion unit and the electromagnetic driving fan 10 as the second propulsion unit are disposed at each of the wings of the aircraft.

First of all, in FIG. 4(a), for example, in an initial state of take-off in which the aircraft is transferred from a resting state to an accelerating state, a thrust vector of the electromagnetic driving fan 10 is caused to correspond to the traveling direction by the rotating mechanism portion 2, which is the thrust vectoring means, so that thrust in a horizontal direction is maximized. Next, in FIG. 4(b), for example, in an end sate of take-off in which the aircraft receives lift force and takes off, a thrust vector of the electromagnetic driving fan 10 is caused to correspond to the take-off direction by the rotating mechanism portion 2, which is the thrust vectoring means, by, for example, inclining a rotation angle backward so that thrust in the take-off direction is increased. In FIG. 4(c), for example, in a cruising state in which the aircraft steadily travels at a predetermined altitude or speed, the electromagnetic driving fan 10 is disposed ahead of and coaxially with the turbofan engine 1 by the slide mechanism portion 3, which is the wing moving means, in order to reduce the air resistance as much as possible, as a result of which a front projected area of the airplane is reduced, and the air resistance to the airplane during cruising is reduced. Alternatively, the electromagnetic driving fan 10 is stored in the wing by the storage mechanism portion 4, which is the storage means, and, as a result, the front projected area of the airplane is reduced, and the air resistance to the airplane during cruising is reduced. In FIG. 4(d), for example, in a landing state of the aircraft, while a fan of the turbofan engine 1 performs injection so that thrust in a direction opposite the traveling direction is produced, in the electromagnetic driving fan 10 the current applied to the excitation coils is directed backward to rotate the fan blade 11 in the reverse direction, or to rotate the fan blade 11 normally by changing a rotational phase angle of the electromagnetic driving fan 10 by 180° by means of the rotation mechanism portion 2, whereby the thrust in a direction opposite the traveling direction is produced.

As described above, since the electromagnetic driving fan 10 is light in terms of weight and has a simple configuration, the thrust vectoring mechanism, wing moving mechanism, and storage mechanism can be easily applied to the electromagnetic driving fan 10, and, in the aircraft propulsion system 100, the optimum thrust, thrust vector, and engine sectional area in accordance with flight conditions can be secured. Especially, high lifting of aircraft by means of thrust vectoring at the time of take-off, reduction of air resistance by folding the fan at the time of cruising, and generation of thrust in the opposite direction at the time of landing can be realized. Specifically, short take-off and landing and small drag cruising can be realized easily.

Figure 5:
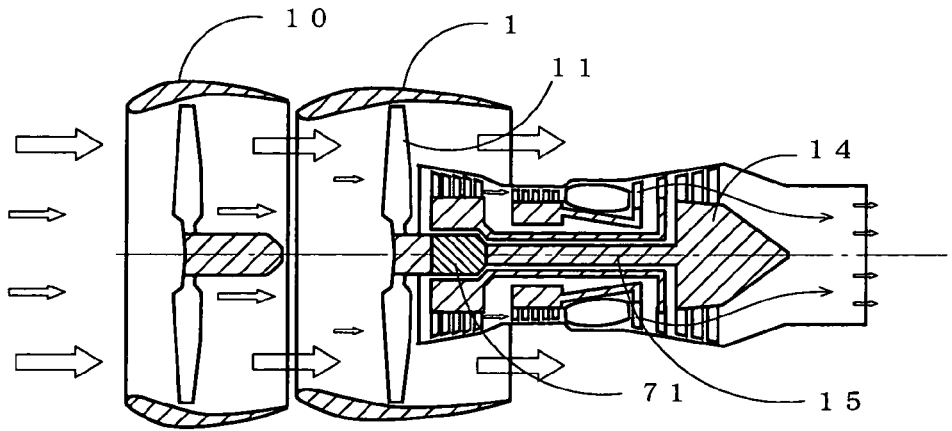
FIG. 5 is an explanatory diagram showing a electrical generator as the electrical output generating means of the aircraft propulsion system of the present invention.
Figure 5:
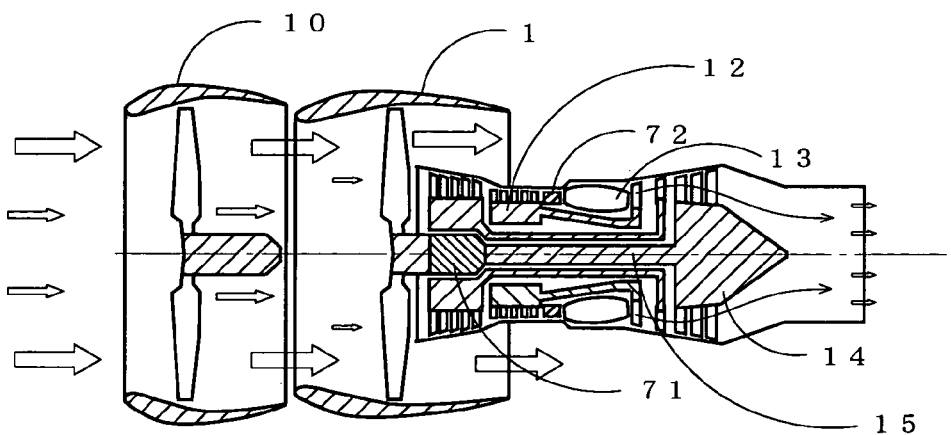
Figure 5:
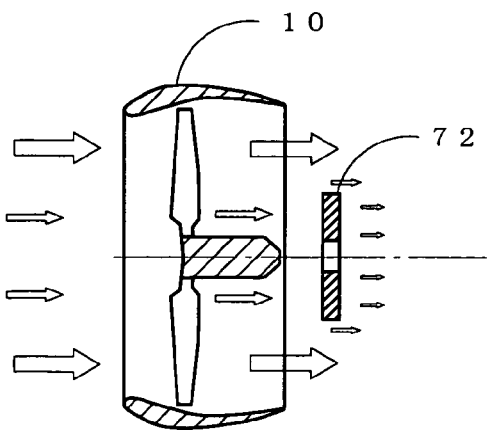

FIG. 5 is an explanatory diagram showing the electrical generator 7 as the electrical output generating means of the aircraft propulsion system of the present invention.

First of all, in FIG. 5(a), a fan drive shaft 15 of the turbofan engine 1 is coupled to an aircraft generator 71, which is rotary driven by output power of a low pressure turbine 14, whereby electric power is produced. The produced electric power is accumulated in the accumulating portion 8 (not shown), e.g. electrical accumulator, and at the same time supplied to the electromagnetic driving fan, other electrical machines, and electronic devices. Next, in FIG. 5(b), the aircraft generator 71 as the electrical output generating means is coupled to the fan drive shaft 15 of the turbofan 1, the aircraft generator 71 is then rotary driven by the output power of the low pressure turbine 14 to produce electric power, and at the same time air from a compressor 12 is obtained as an oxidant, and the electric power is produced by a fuel cell 72 which uses liquid hydrogen as fuel. The fuel cell 72 is disposed between the compressor 12 and a combustor 13 of the turbofan 1. Accordingly, compressed air can be supplied to an oxidant electrode of the fuel cell 72, and the electrical efficiency of the fuel cell 72 is improved. Also possible is a configuration in which the compressed air is extracted from a compressor outlet portion by providing the fuel cell 72 in parallel with the turbofan engine 1 to introduce the extracted compressed air to the oxidant electrode of the fuel cell 72. Next, in FIG. 5(c), as the electrical output generating means, the air from the electromagnetic driving fan 10 is obtained as an oxidant, and the fuel cell 72 using the liquid hydrogen as fuel is combined with the electrical accumulator (not shown). It should be noted that the electrical accumulator is what is termed "secondary battery."

Liquid hydrogen is used as fuel for the fuel cell and the turbo fan engine. However, the liquid hydrogen is not introduced as liquid to the fuel side electrode of the fuel cell, but, first of all, cools the armature coil and excitation coil of the electromagnetic driving fan 10 to bring them into a superconductive sate. Accordingly, current can be allowed to flow in the armature coil and excitation coil without producing almost no loss of electrical resistance, and the energy efficiency of the electromagnetic driving fan 10 can be improved. Thereafter, the liquid hydrogen is introduced to the heat exchanger 6 provided inside the exhaust nozzle. Accordingly, energy of the exhaust is collected as heat energy, and the energy efficiency of the entire system can be improved. After vaporized in the heat exchanger 6, the liquid hydrogen is provided to the combustor 13 of the turbofan engine 1 and to the fuel side electrode of the fuel cell 72. The hydrogen is combusted and reacts with the compressed air in the combustor, and thereby produces water vapor. The vapor reduces combustion temperature, and preferably controls generation of $NO_x$, i.e. nitrogen oxides. Moreover, hydrogen fuel does not contain carbon, and thus does not exhaust carbon dioxide which is a cause of global warming. In addition, the electric power, which is produced by the aircraft generator of the electrical output generating means such as the fuel cell, becomes the drive source for the electromagnetic driving fan 10, thus an operational ratio of the turbofan engine 1 having the combustor is reduced and an operational ratio of the electromagnetic driving fan 10 is increased, whereby the amount of exhaust containing nitrogen oxide is reduced. Therefore, environmental compatibility is significantly improved, compared to the conventional aircraft propulsion systems which use fossil fuel.

On the other hand, in the electromagnetic driving fan 10, the armature coil is disposed on the outer circumference of the fan, thus large torque can be produced with small size of the force, and the outer diameter of the fan blade 11 can be enlarged. As a result, the electromagnetic driving fan 10 is disposed ahead of the axis of the turbofan engine 1 by the slide mechanism portion 3, whereby the bypass ratio of the turbofan engine 1 is increased, and the noise level is reduced.

Although the effectiveness of the gas turbine and fuel cell that use hydrogen as fuel has been studied and well known, the worst disadvantage is the capacity and weight that relate to storage of hydrogen. It is expected that this fact be resolved by further investigation of materials and the like, but effective use of liquid hydrogen in the entire engine system overweighs compensation of the drawback. The electromagnetic driving fan can secure extremely high efficiency and performance by using a superconductive coil. The effectiveness has been observed in a test installation of a magnetically levitated transportation system in the past, but, in a large scale practical test, securing the superconductive state is achieved mainly by means of liquid helium in an extremely low temperature of 4 Kelvin. Due to this fact, the technology using superconductive materials has difficulties in terms of its application in an extremely low-temperature environment, thus study has been performed toward the objective of securing the superconductive state at higher temperature in order to solve the difficulties. As one of the objectives, there is a superconductive material corresponding to 77 Kelvin, which is the boiling point of liquid nitrogen. Some superconductive materials corresponding to this temperature have been realized in a study phase, but the situation is that a phase of practical use has not been reached yet. However, the boiling point of the liquid hydrogen explained in the present embodiment is 14 Kelvin, and materials corresponding to this temperature have been studied in relatively large numbers, and the possibility of practical use of such materials is high compared to use of liquid nitrogen. By using the liquid hydrogen as a superconductive drive means, and by performing regenerative heat exchange with engine exhaust heat, the liquid hydrogen is gasified. The gasified hydrogen is used as fuel for the gas turbine or fuel cell. Among the fuel cells using hydrogen, some are driven at low temperatures. However, when used as a combined cycle with the gas turbine, a fuel cell of high-temperature operation type can be used to achieve improvement of the heat efficiency by effectively using the gas turbine and heat.

Figure 6:
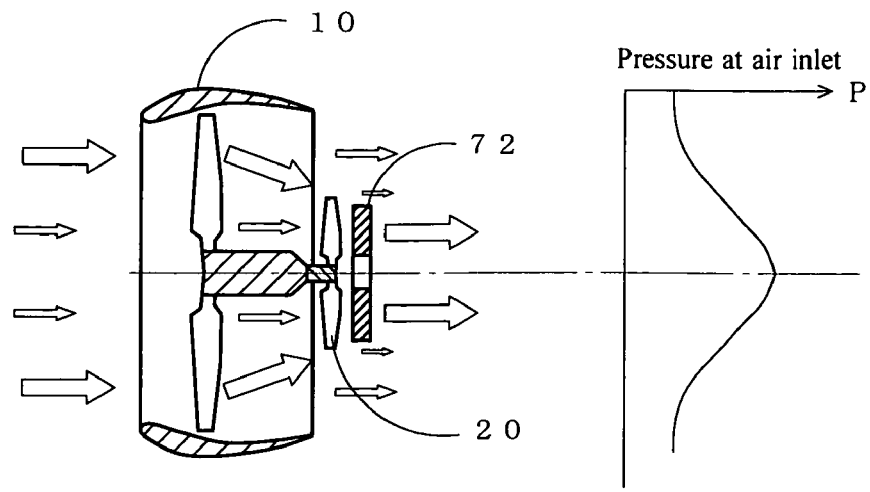
FIG. 6 is an exemplifying diagram showing an operation of pressure increasing means of an air inlet of the fuel cell.
Figure 6:
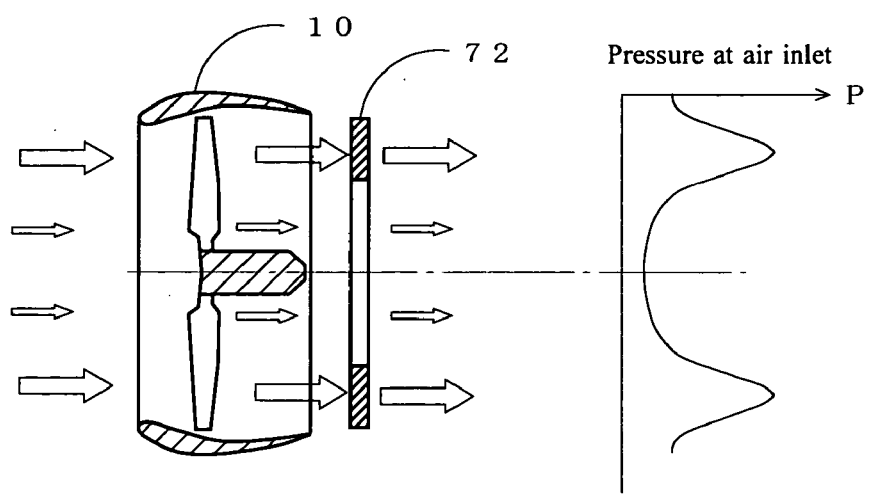

FIG. 6 is an exemplifying diagram showing an operation of pressure increasing means of an air inlet of the fuel cell.

Use of a single fuel cell can increase the fan bypass ratio in examples of core engines excluding electrical accumulators, and is desirable in terms of environmental compatibility. When using fuel cells, the pressure of air supplied to the fuel cells can be raised easily by combining the fuel cells with a gas turbine such as the turbofan engine 1. However, when using a single fuel cell, the pressure of air taken to the fuel cell needs to be increased more than most of exhaust by means of the electromagnetic driving fan 10. FIG. 6 shows an example of the pressure increasing means used in this situation. As shown in FIG. 6(a), a small boost fan 20 is provided in a coaxial slipstream of the electromagnetic driving fan 10 to increase the pressure at the fuel cell air inlet. As shown in FIG. 6(b), by appropriately designing the blade lattice of the fan so that pressurization at an outer peripheral portion where peripheral velocity is high is made larger than an inner peripheral portion, and an air intake port of fuel cell is provided at the slipstream. In the example of FIG. 6(b), since the blade lattice can be designed easily, the fuel cell is disposed on a periphery at the outer peripheral portion of the fan, but the fuel cell can be provided on an inner side with respect to a central axis of rotation of the fan by providing a vectoring duct introducing the outer air to the center portion. The fuel cell discharge high-temperature exhaust in either embodiment. It is possible to contribute this exhaust to propulsion by appropriately mixing it with fan exhaust air.

According to the aircraft propulsion system 100 of the present embodiment, the following effects can be obtained in terms of improvement of the flight performance.

(1) The electromagnetic driving fan 10 is an electromagnetic driving fan in which the armature coil is disposed on the outer circumference of the fan blade 11 and the excitation coil is disposed in on the inner peripheral surface of the fan casing, thus heavy parts such as a core engine and an iron core are not necessary, whereby the configuration thereof can be made simple and the weight thereof can be reduced significantly to be lightweight.

(2) As a result, the thrust vectoring mechanism for changing a thrust vector, the storage mechanism for storing the second propulsion unit in a wing or folding the unit at a surface of the wing, and the wing driving mechanism for moving the second propulsion unit with respect to a width direction of the wing and a wing chord direction can be realized easily. Accordingly, the optimum thrust and thrust vector for flight conditions can be secured, and the optimum sectional area for the engine in accordance with the flight conditions can also be secured.

Moreover, according to the aircraft propulsion system 100 of the present invention, the following effects can be obtained in terms of environmental compatibility.

(1) The electromagnetic driving fan 10 uses the electrical energy as the energy source, thus it doest not discharge exhaust containing harmful substances.

(2) Since the turbofan engine 1 comprises the electrical output generating means, the electrical energy is preferably generated and accumulated to enhance an operational ratio of the electromagnetic driving fan 10, as a result of which the amount of exhaust containing harmful substances is reduced.

(3) The electromagnetic driving fan 10 has the energy collection function and uses liquid hydrogen fuel as fuel for the turbofan engine 1, and the liquid hydrogen brings the armature coil and the excitation coil of the electromagnetic driving fan 10 to a superconductive state, thus there is almost no loss of electrical resistance. As a result, the energy efficiency of the electromagnetic driving fan is improved. Further, the liquid hydrogen exchanges heat with exhaust, the energy of the exhaust is collected as heat, resulting in improvement of the energy efficiency of the entire system.

(4) Furthermore, the electrical efficiency of the fuel cell is improved due to the fact that vaporized hydrogen gas is provided to the fuel cell and the combustor, and that the fuel cell is disposed between the compressor and the combustor.

(5) In addition, in the combustor, the temperature of the exhaust is reduced by water vapor which is generated as a result of a combustion reaction, whereby generation of nitrogen oxides is controlled preferably. At the same time, the liquid fuel does not contain carbon compound, and thus does not exhaust carbon dioxide.

(6) In the electromagnetic driving fan 10, the armature coil producing electromagnetic force is disposed on the outer circumference of the fan, large torque can be produced with small size of the force, as a result of which the outer diameter of the fan can be enlarged. Accordingly, the bypass ratio can be increased, the noise level at the time of exhaust of exhaust gas is reduced.

The aircraft propulsion system of the present invention can be preferably applied to an engine portion of aircraft, particularly to an engine portion of large aircraft.

What is claimed is:

1. An aircraft propulsion system, comprising:
a first propulsion unit which generates thrust; and
a second propulsion unit which has thrust vectoring means for varying a vector of the thrust,
wherein the second propulsion unit is an electromagnetic driving fan in which $M_i$ row, where $i=1, 2, \ldots, n$, as split armature coils, that is a figure-of-eight coil which crosses and forms symmetry at a central portion, are disposed on an outer circumference of the fan, and a coil $A_i$ row and a coil $B_i$ row, where $i=1, 2, \ldots, n$, as split excitation coils, that form a rectangle, are disposed on an inner peripheral surface of a casing portion of the fan so that when one of the split excitation coils referred to as the coil $A_i$ in coil row of split excitation coils, overlaps the central portion of one of the split armature coils, two other split excitation coils adjacent to the coil $A_i$ referred to as the coil $B_{i-1}$ and $B_i$ in coil row of split excitation coils, overlaps with either of the end portion of the split armature coils respectively, and
wherein each of the split excitation coils comprises:
a condenser which constitutes an LC circuit,
a switching device which conduct current to each of the split excitation coils in two directions,
a switching circuit which switches the bias direction of the condenser in accordance with the polarity of the condenser, and
a power source which supplies an electrical charge to the condenser,
wherein in the timing when one of the split excitation coils overlaps with the central portion of one of the split armature coils, conducting alternating currents whose sizes are equal and whose directions are opposite with each other, to two other split excitation coils overlapping with either of the end portion of the split armature coils which supply the split armature coils with an effective induced current contributing to the rotation of the fan, and at the same time conducting alternating current to the split excitation coils overlapping with the central portion of the split armature coils which supply the split armature coils with an effective magnetic field intersecting with the central portion of the split armature coils contributing to the rotation of the fan, and an effective electromagnetic force is generated by the interaction between the effective induced current and the effective magnetic field, and the fan is rotated by summation of all the effective electromagnetic forces over all the split armature coils.

2. The aircraft propulsion system according to claim 1, further comprising storage means for storing the second propulsion unit in a wing or folding the unit at an external surface of the wing, and wing moving means for moving the second propulsion unit with respect to a width direction of the wing and a wing chord direction.

3. The aircraft propulsion system according to claim 1, wherein the first propulsion unit uses liquid hydrogen as fuel.

4. The aircraft propulsion system according to claim 3, further comprising means in which the liquid hydrogen brings the armature coil and the excitation coil to a superconductive state, and is vaporized by receiving heat from the first propulsion unit or the second propulsion unit.

5. The aircraft propulsion system according to any of claims 1 through 4, wherein the first propulsion unit or the second propulsion unit comprises electrical output generating means.

6. The aircraft propulsion system according to claim 5, wherein the electrical output generating means is an aircraft generator, a fuel cell, or a combination thereof with an electrical accumulator.

7. The aircraft propulsion system according to claim 6, wherein the generating means is the fuel cell or the fuel cell in combination with the aircraft generator, and wherein the fuel cell uses liquid hydrogen as fuel.

8. The aircraft propulsion system according to claim 6, wherein the generating means is the fuel cell or the fuel cell in combination with the aircraft generator, and wherein the fuel cell is disposed between a compressor and a combustor that configure the first propulsion unit.

9. The aircraft propulsion system according to claim 6, wherein the generating means is the fuel cell or the fuel cell in combination with the aircraft generator, and wherein the second propulsion unit comprises means for increasing inlet pressure of the fuel cell.

* * * * *